(12) United States Patent
O'Brien et al.

(10) Patent No.: US 9,434,873 B2
(45) Date of Patent: Sep. 6, 2016

(54) CERAMIC PROPPANTS

(71) Applicants: Frank O'Brien, St. Louis, MO (US); Chris Heller, St. Louis, MO (US)

(72) Inventors: Frank O'Brien, St. Louis, MO (US); Chris Heller, St. Louis, MO (US)

(73) Assignee: Shamrock Group, St. Louis, MO (US)

( * ) Notice: Subject to any disclaimer, the term of this patent is extended or adjusted under 35 U.S.C. 154(b) by 2 days.

(21) Appl. No.: 14/275,226

(22) Filed: May 12, 2014

(65) Prior Publication Data
US 2015/0068745 A1    Mar. 12, 2015

Related U.S. Application Data

(63) Continuation-in-part of application No. 12/986,479, filed on Jan. 7, 2011, now Pat. No. 8,722,590.

(51) Int. Cl.
| | |
|---|---|
| C09K 8/74 | (2006.01) |
| C23F 11/18 | (2006.01) |
| E21B 43/267 | (2006.01) |
| C09K 8/80 | (2006.01) |
| C04B 41/00 | (2006.01) |
| C04B 35/18 | (2006.01) |

(52) U.S. Cl.
CPC .................. *C09K 8/80* (2013.01); *C04B 35/18* (2013.01); *C04B 41/0072* (2013.01); *E21B 43/267* (2013.01); *C04B 2235/3206* (2013.01); *C04B 2235/3208* (2013.01); *C04B 2235/3213* (2013.01); *C04B 2235/3232* (2013.01); *C04B 2235/3272* (2013.01); *C04B 2235/3291* (2013.01); *C04B 2235/349* (2013.01); *C04B 2235/3454* (2013.01); *C04B 2235/528* (2013.01); *C04B 2235/5296* (2013.01); *C04B 2235/5427* (2013.01); *C04B 2235/72* (2013.01); *C04B 2235/77* (2013.01)

(58) Field of Classification Search
CPC ............................ C09K 8/80; Y10S 607/906
USPC ......................... 507/269, 271, 906
See application file for complete search history.

(56) References Cited

U.S. PATENT DOCUMENTS 4,427,068 A * 1/1984 Fitzgibbon ............ E21B 43/267
166/280.2

* cited by examiner

*Primary Examiner* — Aiqun Li
(74) *Attorney, Agent, or Firm* — C. John Brannon; Brannon Sowers & Cracraft PC

(57) ABSTRACT

A sintered, generally spherical ceramic body, having an alumina content of from about 52 to about 55 weight percent distributed substantially homogeneously throughout the body, a silica content from about 32 to about 38 weight percent distributed substantially homogeneously throughout the body, an apparent specific gravity of about 2.61 to about 2.65, and a bulk density of about 1.45 to about 1.56 grams per cubic centimeter.

1 Claim, No Drawings

CERAMIC PROPPANTS

CROSS-REFERENCE TO RELATED APPLICATIONS

This patent application is a continuation-in-part of and claims priority to co pending U.S. patent application Ser. No. 12/986,479, filed on Jan. 7, 2011.

TECHNICAL FIELD

The claimed technology relates generally to small, generally spherical ceramic bodies and, more particularly, to alumina-silicate proppant bodies for use in fracturing subterranean geological formations.

BACKGROUND

Hydraulic fracturing is a technique for increasing the output and productivity of oil and gas wells by cracking the geological formation surrounding and defining an oil and/or gas reserve to create pathways through which the entrapped oil and/or gas may more easily flow for extraction. First, a highly pressurized fluid is injected into an existing well bore at a sufficiently high rate of flow to put sufficient stress on the geological formation to induce fracturing thereof, thus creating a network of cracks in the rock defining the oil and gas reservoir. Next, a fluid containing a vast amount of small particulate propping agents, or proppants, is introduced into the crack network such that the proppants will become positioned in the newly-opened fissures to prevent their closure due to geological forces. In other words, the proppants literally "prop" the cracks open.

To do their jobs, the proppants are typically formed to have sufficient mechanical strength to hold the cracks open against the dynamic geological forces that would otherwise operate to close or distort them. Typically, these geological forces increase with the depth of the well. Also, proppants are typically made to be somewhat fluid permeable and/or conductive, such that even when present in aggregate, they do not substantially obstruct the flow of oil and/or gas desired to be extracted from the well. Typically, propping agents have been made stronger through densification or by increasing the alumina content thereof. However, denser, heavier proppants are harder to pump, more expensive to transport, and are less permeable than lighter, more porous agents.

Another desired characteristic of proppants is that they be inexpensive to produce, since it takes a great volume of proppants to hold open cracks in even a relatively small well. Sand is cheap and plentiful and is often selected as an advantageous propping agent for maintaining the cracks formed in wells and geological formations experiencing relatively low closure forces (i.e., 4,000 psi or less). Moreover, the strength of the sand may be extended to withstand closure forces of 8000 psi or more through such sorting processes as screening, sizing and shaping the sand. However, the sand proppant performance drops off dramatically as the closure forces increase, such that even highly processed and selected sand is inadequate under closure forces much exceeding 10,000 psi. Further, sand tends to be nonporous, and as such is less than ideal from a permeability standpoint. Moreover, the sorting and processing steps add expense, thus detracting from one of the main characteristics, low expense, making sand attractive in the first place.

Some high-alumina aluminosilicate compositions, such as bauxite with an alumina content in the 75-90% range, offer sufficient strength to function as proppants under relatively high closure forces and at relatively great well depths. However, these high-alumina proppants likewise have high densities/apparent specific gravities approaching or exceeding 3.5 g/cc, and thus add the requirement of high viscosity pumping fluids and/or high pumping rates to prevent them from settling out during the injection process. Increased fluid viscosity and the requisite high pumping rates cost precision and control of the injection operation, thus making fracture control and high conductivity fractures more difficult to achieve and maintain. Moreover, the high-alumina proppants tend to be more abrasive, and thus speed the wear of the pumping and fluid transport equipment. Additionally, sintered high-alumina compositions are relatively expensive, often priced ten to fifteen times that of sand.

Intermediate density proppants, defined as those having an apparent specific gravity in the 3.1 to 3.4 g/cc range, have been developed to provide sufficient strength to keep cracks open at well depths of from about 8,000 to about 12,000 feet. In these materials, lower density is achieved primarily by reduction of the alumina content to about 75%. Proppants having even lower densities, such as around 3.0 g/cc, have been formed from kaolin clay precursors and are characterized by an alumina content of about 50%. These low density proppants are typically intended for use at well depths up to about 8,000 feet.

An even lower density proppant has been developed having an alumina content of from 25% to 40% and an apparent specific gravity of from 2.20 to 2.60 g/cc. While the reduced density allows for the use of less viscous pumping fluid and lower pumping rates (which are both desirable for prolonging equipment life and thus reducing repair and replacement costs), the tradeoff is in proppant strength. Lowering the alumina content of the material generally results in a lower density proppant with corresponding lower strength, since the higher silica content results in significant loss of strength.

Accordingly, there has been a definite need for a proppant composition enjoying both lower density and less expensive precursor materials that also has yield proppants having sufficient mechanical strength to withstand closure pressures of 8000-10,000 psi or greater. The claimed novel technology addresses these needs.

SUMMARY

The claimed novel technology relates to an improved formulation for ceramic proppant bodies characterized by a relatively low alumina content. One object is to provide an improved ceramic proppant formulation. Related objects and advantages of the claimed technology will be apparent from the following description.

DESCRIPTION OF THE PREFERRED EMBODIMENTS

For the purposes of promoting an understanding of the principles of the claimed technology and presenting its currently understood best mode of operation, reference will now be made to the embodiments and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

The claimed technology relates to a light weight sintered ceramic material of intermediate strength, such as a propping agent or proppant useful in the hydraulic fracturing of subterranean geological formations surrounding and defining oil wells, gas wells and similar boreholes. The sintered ceramic material is typically formed as solid, substantially spherical particles or pellets and is typically characterized as having a silica content between about 52 and about 58 weight percent, an alumina content of between about 32 and about 39 weight percent, an apparent specific gravity of between about 2.61 and 2.69 (more typically between about 2.63 and 2.65), a bulk density of between about 1.41 and about 1.65 grams per cubic centimeter (more typically a loose fill density of between about 1.45 and 1.55, or between about 1.54 and about 1.61 g/cc), Krumbein sphericity of at least about 0.7 (more typically at least about 0.8 and still more typically at least about 0.9), a mechanical crush strength such that no more than 10% of a test population are crushed at 7500 PSI (more typically no more than 5% at 7500 PSI and/or no more than 10% at 8000 PSI), and an ambient temperature permeability of at least about 100,000 millidarcies at 8,000 psi.

More particularly, the aluminosilicate proppant particles typically have a silica ($SiO_2$) content of between about 54 and about 55 weight percent, an alumina ($Al_2O_3$) content of between 30 and about 36 weight percent. Typical proppant particle composition ranges (in weight percents) are as follows:

|  | Typical | More Typical |
|---|---|---|
| $SiO_2$ | 52-60 | 54-55 |
| $Al_2O_3$ | 30-38 | 32-36 |
| $TiO_2$ | 1.7-3.0 | 1.7-2.5 |
| $Fe_2O_3$ | 1.5-5.0 | 2.2-3.3 |
| CaO | 0.2-0.4 | 0.2-0.4 |
| MgO | 0.2-1.0 | 0.3-0.6 |
| $K_2O$ | 0.4-2.5 | 1.5-2.0 |
| $SrO_2$ | 0.01-0.1 | 0.01-0.1 |
| Total | 100.00 | 100.00 |

These proppants typically have a specific gravity of between about 2.61 and about 2.69 and more typically between about 2.63 and about 2.65. The proppants typically have a bulk density of between about 1.41 and about 1.65, and more typically between about 1.45 and about 1.55 gm/cc.

Typically, the propping agent particles are made from high-iron aluminosilicate materials or fireclay typically found deposited in and around St. Louis, High Hill and Mexico Missouri (i.e., Missouri fireclay). Similar mineral formations may also be found in such places as Ohio, Kentucky, Pennsylvania, certain parts of Europe and the like. In general, Missouri fireclay is a relatively high iron-content bauxite or bauxitic material. Typically, the Missouri fireclay will be blended with at least some (typically, about 5 weight percent or more) high iron aluminosilicate, a high iron aluminosilicate source, or similar mineral compositions.

A small amount (typically around 5 weight percent) crush strength enhancer material may be added to the Missouri fireclay to increase the strength of the proppants produced therefrom. The crush strength enhancer is typically a material such as nepheline syenite, fused bauxite dust, wollastonite, talc, feldspar, rutile, bentonite, ball clay, fireclay or the like, which act to increase the strength of the aluminosilicate proppants particles without substantially altering their density, specific gravity, conductivity and the like. Typically, small additions of crush strength enhancers such as these operate to impede cristobalite formation during the sintering of the proppant particles, thus increasing their crush strength.

The propping agent particles are typically prepared from a dry mixed precursor including the Missouri fireclay material, any additional clays, any strength enhancing additives, and a suitable binder to yield a composition within the ranges outlined above. In other embodiments, the precursors may be mixed as an aqueous suspension or the like. The dry mixed precursor is typically a substantially homogeneous mixture, and yields green and, later, fired proppants having substantially homogeneous compositions with the component oxides homogeneously distributed therein. The mixture is then granulated through mixture-intensive shaping into generally spherical particles. The generally spherical particles are typically larger than the desired size of the final proppant particles, to allow for shrinkage to occur during the firing process (i.e., the final proppant size is typically targeted to a convenient size range, such as 16/30 mesh, 20/40 mesh, 40/80 mesh, or the like). Those fractions of undesired sizes, such as undersized and oversized fractions, are typically recycled into the layer of fluidized particles. The non-recycled fractions are then typically dried, calcined and sintered. Sintering is typically accomplished at a temperature of between about 2345 and about 2450 degrees Fahrenheit (or between about 1285 and about 1327 degrees Celsius) to yield sintered proppants.

The as-sintered proppants typically have a specific gravity of between about 2.61 and about 2.69, more typically about 2.63 to about 2.65; this relatively low specific gravity allows for easier and less destructive pumping of a fluid containing the proppants for injection into crack formations. More typically, the proppants are characterized by a Krumbein sphericity of about 0.7 or greater. Still more typically, the proppants have a Krumbein sphericity of at least about 0.8; yet more typically, the proppants have a Krumbein sphericity of at least about 0.9.

Typically, the propping agents have sufficient mechanical strength such that 80% of a sample may withstand crushing forces of 7500 psi; more typically, at least about 90% survive. Still more typically, the propping agents have sufficient mechanical strength such that 90% of a sample may withstand crushing forces of 8000 psi and/or 95% of the sample may withstand a crushing load of 7500 psi. In other words, the proppants are typically characterized by a 20% crush at 7500 psi; more typically a 10% crush at 7500 psi; and still more typically by a 10 percent crush at 8000 psi and/or a 5% crush at 7500 psi.

Aluminosilicate ore blend from St. Louis, Mo. having the following analysis by weight after ignition at 800 degrees Celsius: $SiO_2$ —57%; $Al_2O_3$ —35%; $TiO_2$ —1.8%; $Fe_2O_3$ —3.5%; with the remainder being alkali and alkali-earth metal oxides. Green strength may be increased through the addition of starches, swelling clay, KCl, NaOH, $NH_4Cl$, PVA, or other binders.

This material is generally formed through mixer granulation techniques to yield a small, generally spherical pellet. The pellets are typically screened and extracted and sized in target, oversized and undersized fractions or ranges. The oversized fractions may be ground down to size, such as in a grinding unit, while the undersized fractions may be recycled or extracted for other uses. The remaining material at target size may be calcined to remove excess moisture and volatilize unwanted organics. The remaining material may then be formed into any desired shapes and sizes, and/or merely sintered in a rotary kiln at a temperature of between about 1285 and 1325 degrees Celsius for 30 minutes or less. The sintered substantially spherical particles are characterized by a substantially homogeneouos distribution of silica and alumina therethrough. The sintered particles are then subjected to a further sieving operation to further control the desired particle size.

In operation, sintered proppant particles of the above compositional range are fluidically injected into precracked geological formations surrounding and defining oil and/or gas wells. The proppants become positioned in the cracks in sufficiently high numbers and concentrations to wedge or prop the cracks open, resisting geological forces arising that would otherwise urge the cracks shut. The proppants provide a propping layer that is sufficiently fluid permeable/conductive that fluids such as oil and/or gas may readily escape through the cracks and be extracted from the well.

Likewise, the proppants may be prepared and formed via any convenient alternate aqueous process or any convenient dry or powder process.

EXAMPLES

Example 1

A 20/40 mesh proppant sample was prepared and crush tested. The composition of the proppant sample was analyzed via inductively coupled plasma-atomic emission spectroscopy and was found to have the following composition, expressed in oxide form:

| | |
|---|---|
| $Al_2O_3$ | 35.61 wt. % |
| $SiO_2$ | 57.81 wt. % |
| $Fe_2O_3$ | 2.39 wt. % |
| $K_2O$ | 1.71 wt. % |
| $TiO_2$ | 2.00 wt. % |
| MgO | 0.46 wt. % |
| CaO | 0.30 wt. % |
| $SrO_2$ | 0.06 wt. % |

The specific gravity of the sample was measured to be 2.63 and the bulk density was measured to be 1.49. Portions of the sample were extracted for crush testing at various pressures. The crush test results are as follows:

| Crush PSI | Percentage Crushed |
|---|---|
| 7500 | 3.8 ± 0.3 |
| 10000 | 11.6 ± 0.3 |
| 12500 | 26.6 ± 0.4 |
| 15000 | 32.5 ± 0.6 |

The sample had a crush at 7500 PSI of less than 5% and a crush at 10000 PSI of about 10%.

Example 2

The sample of Example 1 was subjected to roundness and sphericity analysis. Roundness is essentially a measure of the degree of abrasion of particles and may be expressed as the ratio of the average radius of curvature of the edges or corners of a particle to the radius of curvature of the maximum inscribed sphere. Sphericity, while similar in concept to roundness, is a measure of how close in overall shape a particle is to a sphere, and may be taken as the ratio of the surface area of an idealized sphere to the surface area of a particle of the same volume. Sphericity is often visually measured, such as on the Krumbein scale. Thus, since both roundness and sphericity are ratios against ideal cases, the closer the value to 1.0, the more round and/or spherical the particle. Twenty random sample particles were measured both for roundness and sphericity. A measured mean value of 0.8±0.1 was found for both sphericity and for roundness, while the mode was 0.9 for both.

Example 3

A 20/40 mesh proppant sample was prepared and crush tested. The composition of the proppant sample was analyzed via inductively coupled plasma-atomic emission spectroscopy and was found to have the following composition, expressed in oxide form:

| | |
|---|---|
| $Al_2O_3$ | 35.92 wt. % |
| $SiO_2$ | 57.04 wt. % |
| $Fe_2O_3$ | 2.72 wt. % |
| $K_2O$ | 1.80 wt. % |
| $TiO_2$ | 1.96 wt. % |
| MgO | 0.47 wt. % |
| CaO | 0.17 wt. % |
| $SrO_2$ | 0.05 wt. % |

The sample had a specific gravity of 2.63 and a bulk density of 1.49. The acid solubility of the sample was measured to be 4.0%±0.0 in accordance with ISO 13503-2, section 8 procedures using 60% HF as a source.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

We claim:

1. A high strength propping agent for use in hydraulic fracturing of subterranean formations comprising a plurality of solid, substantially spherical particles, wherein the particles are characterized by a specific gravity of between 2.61 and 2.65 grams per cubic centimeter and ambient temperature permeability of at least about 100,000 millidarcies at 8,000 psi; wherein the composition of the particles comprises: about 36 weight percent alumina, about 56 weight percent silica, about 3 weight percent iron oxide, and about 2 weight percent titania, with the remainder being alkali and alkaline earth metal oxides.

* * * * *